(12) United States Patent
Park

(10) Patent No.: US 12,080,838 B2
(45) Date of Patent: Sep. 3, 2024

(54) AUTOMATIC REPLACEMENT DEVICE OF SECONDARY BATTERY MATERIAL

(71) Applicant: SAMSUNG SDI CO., LTD., Yongin-si (KR)

(72) Inventor: Sung Ick Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 724 days.

(21) Appl. No.: 17/077,088

(22) Filed: Oct. 22, 2020

(65) Prior Publication Data

US 2021/0126277 A1   Apr. 29, 2021

(30) Foreign Application Priority Data

Oct. 24, 2019 (KR) .......................... 10-2019-0133287

(51) Int. Cl.
  *B65H 19/18*   (2006.01)
  *H01M 4/04*   (2006.01)
  (Continued)

(52) U.S. Cl.
  CPC .... *H01M 10/0404* (2013.01); *B65H 19/1831* (2013.01); *B65H 19/1852* (2013.01);
  (Continued)

(58) Field of Classification Search
  CPC .......... B65H 19/20; B65H 2301/46172; B65H 19/1852; B65H 19/1873;
  (Continued)

(56) References Cited

U.S. PATENT DOCUMENTS 4,120,739 A * 10/1978 Peeters .................... G03C 1/74
  156/506
4,170,506 A * 10/1979 Marschke .......... B65H 19/1873
  156/159

(Continued)

FOREIGN PATENT DOCUMENTS

| CN | 1387277 A | 12/2002 |
|---|---|---|
| CN | 104009260 A | 8/2014 |

(Continued)

OTHER PUBLICATIONS

European Search Report dated Mar. 31, 2021.
(Continued)

*Primary Examiner* — Scott W Dodds
(74) *Attorney, Agent, or Firm* — Lee IP Law, P.C.

(57) ABSTRACT

An automatic replacement device of a secondary battery material including reel support parts to support a supply reel; a material support part spaced apart from the reel support part; clamping parts, each including a clamping roller to come into contact with the material when replacing the supply reel, a vacuum suction part to suction the material by vacuum, a clamping frame to rotatably support the clamping roller and the vacuum suction part, and a cutter to cut the material when coming into contact with the material; first drive parts to move the clamping roller toward/away from the material; and second drive parts to move the cutter toward/away from the material, wherein the automatic replacement device cuts the material as the material is suctioned to the vacuum suction part after being adhered to a material wound around a replacement supply reel when the supply reel is replaced.

9 Claims, 7 Drawing Sheets

(51) Int. Cl.
*H01M 10/04* (2006.01)
*B65H 19/20* (2006.01)

(52) U.S. Cl.
CPC .......... *B65H 19/1873* (2013.01); *H01M 4/04* (2013.01); *B65H 19/20* (2013.01); *B65H 2301/46172* (2013.01); *B65H 2301/4631* (2013.01); *B65H 2301/46414* (2013.01); *B65H 2406/30* (2013.01); *B65H 2406/34* (2013.01); *H01M 10/0409* (2013.01)

(58) Field of Classification Search
CPC ...... B65H 2301/46414; B65H 2406/30; B65H 2406/34; B65H 19/1831
See application file for complete search history.

(56) References Cited

U.S. PATENT DOCUMENTS

| | | | | |
|---|---|---|---|---|
| 4,172,564 | A | * | 10/1979 | Romagnoli ........ B65H 19/1873 242/555 |
| 4,190,483 | A | * | 2/1980 | Ryan ................ B65H 19/20 242/552 |
| 4,219,378 | A | * | 8/1980 | Marschke .......... B65H 19/1873 156/159 |
| 6,451,145 | B1 | * | 9/2002 | Forbes ............... B65H 19/1836 156/507 |

FOREIGN PATENT DOCUMENTS

| | | |
|---|---|---|
| CN | 105406023 A | 3/2016 |
| CN | 106006134 A | 10/2016 |
| CN | 205739627 U | 11/2016 |
| CN | 108281698 A | 7/2018 |
| GB | 919111 A | 2/1963 |
| KR | 10-2011-0029715 A | 3/2011 |
| KR | 10-1956930 B1 | 9/2014 |
| KR | 2014-0105960 A1 | 9/2014 |
| KR | 10-2016-0012534 A | 2/2016 |
| KR | 10-2016-0133264 A | 11/2016 |
| KR | 10-1857396 B1 | 5/2018 |
| KR | 10-1873198 A1 | 8/2018 |

OTHER PUBLICATIONS

Korean Notice of Allowance dated Mar. 30, 2023.
Chinese Office Action dated Oct. 16, 2023, of the Chinese Patent Application No. 202011154874.4.

* cited by examiner

[FIG. 1]
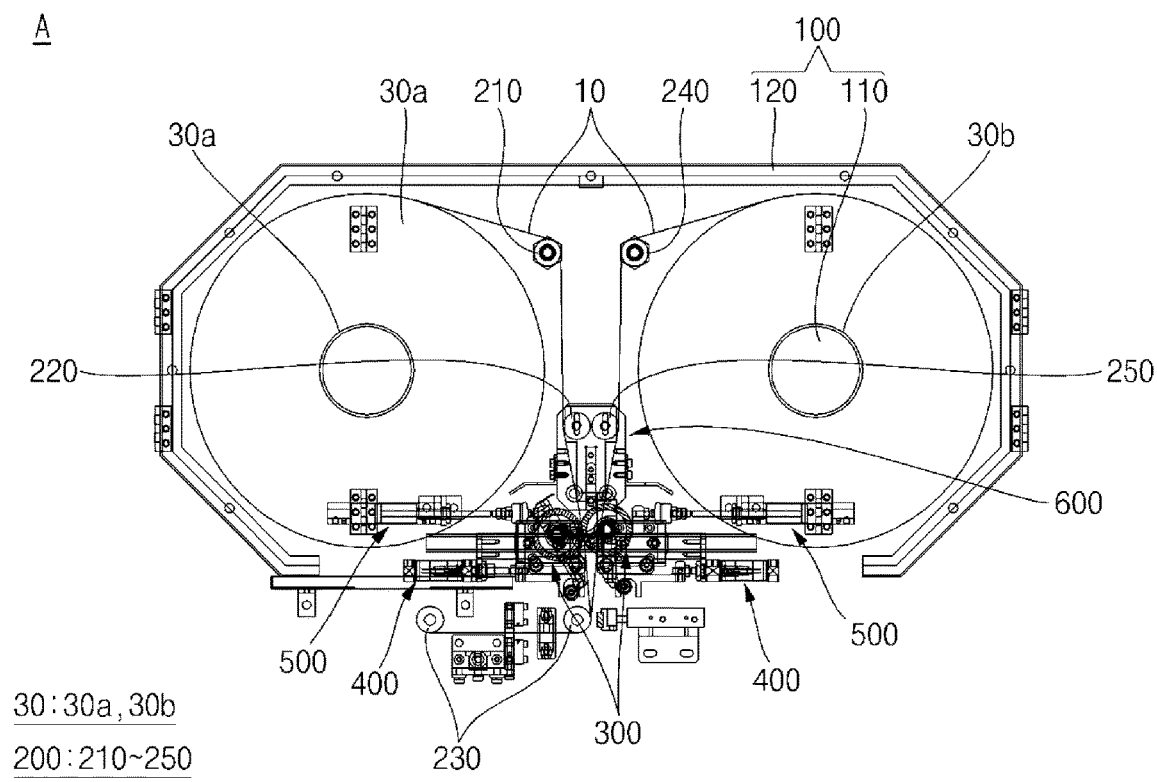

[FIG. 2]
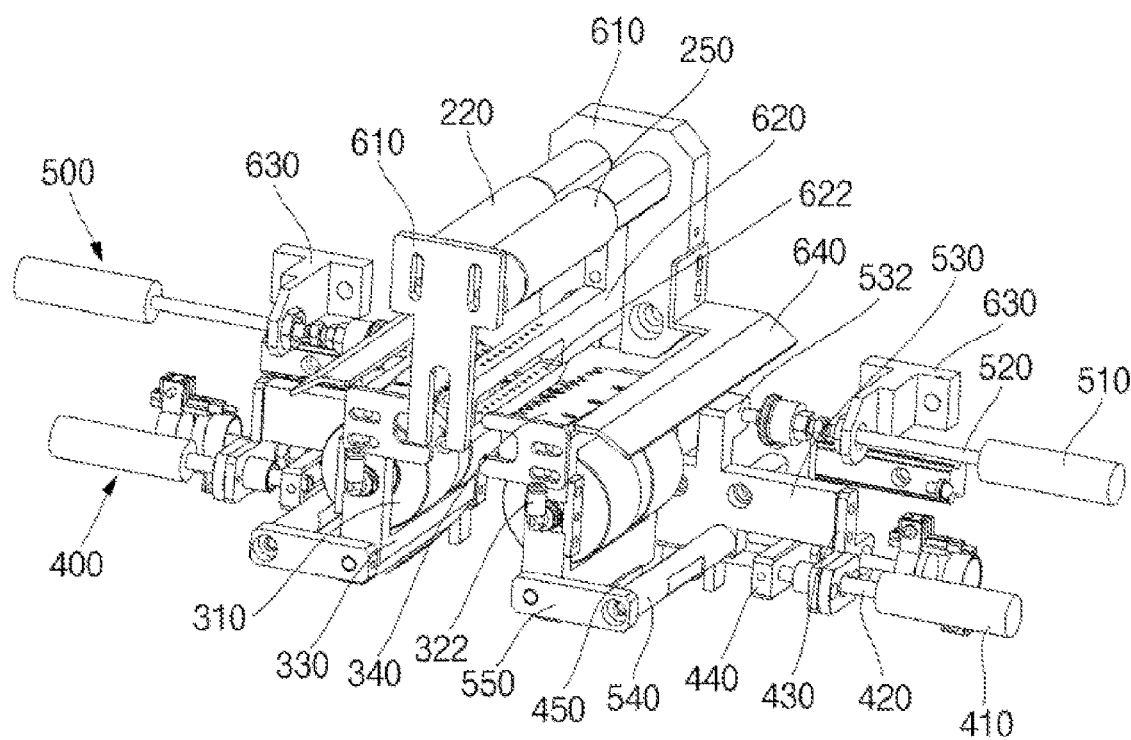

[FIG. 3]
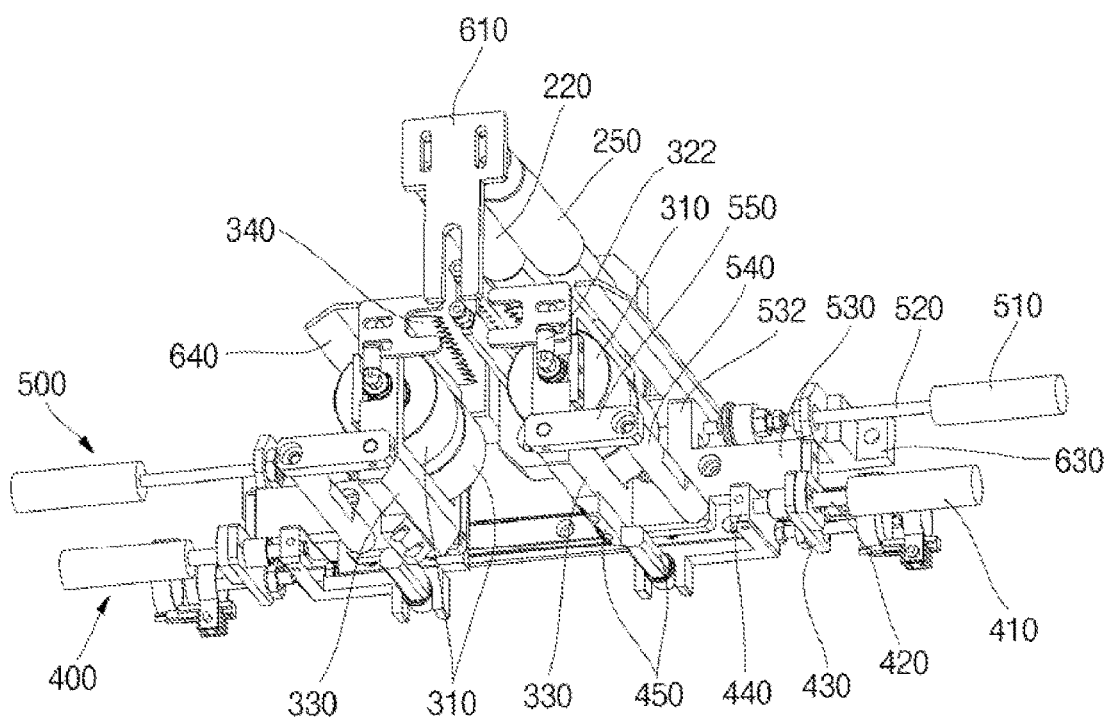

[FIG. 4]
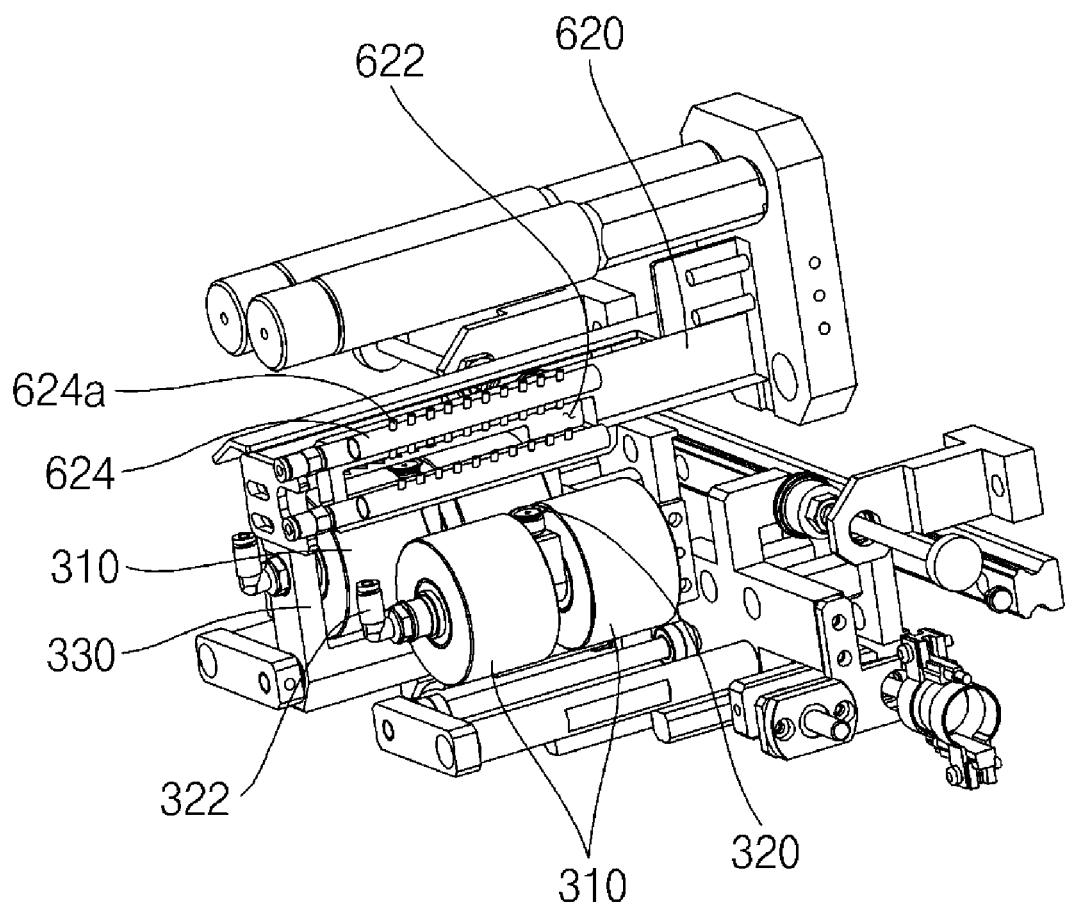

[FIG. 5]
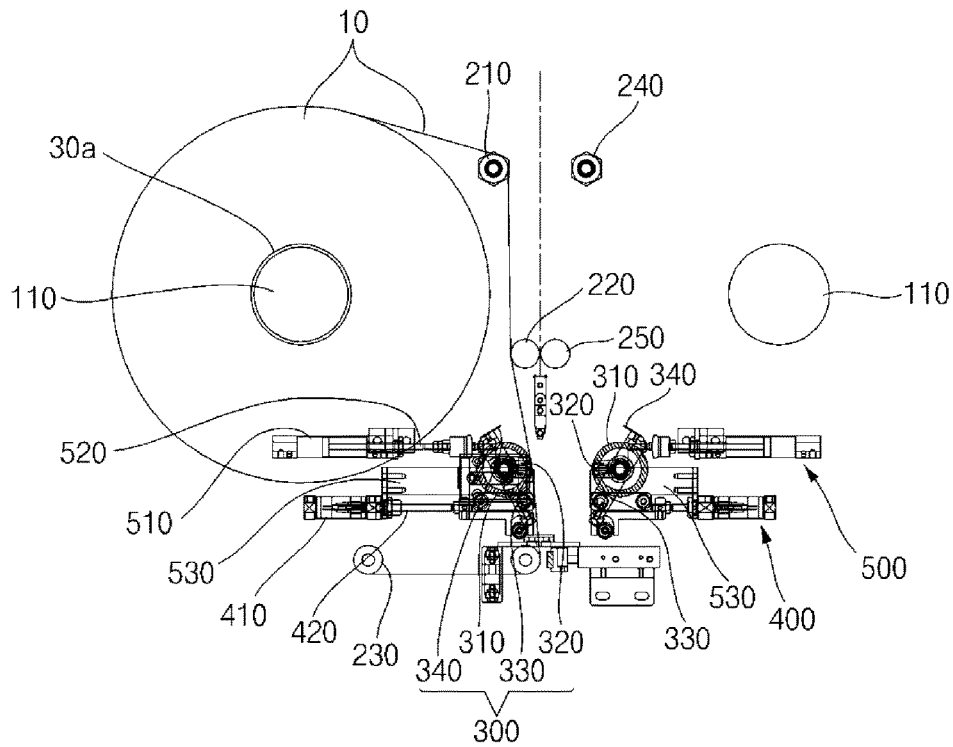
[FIG. 6]
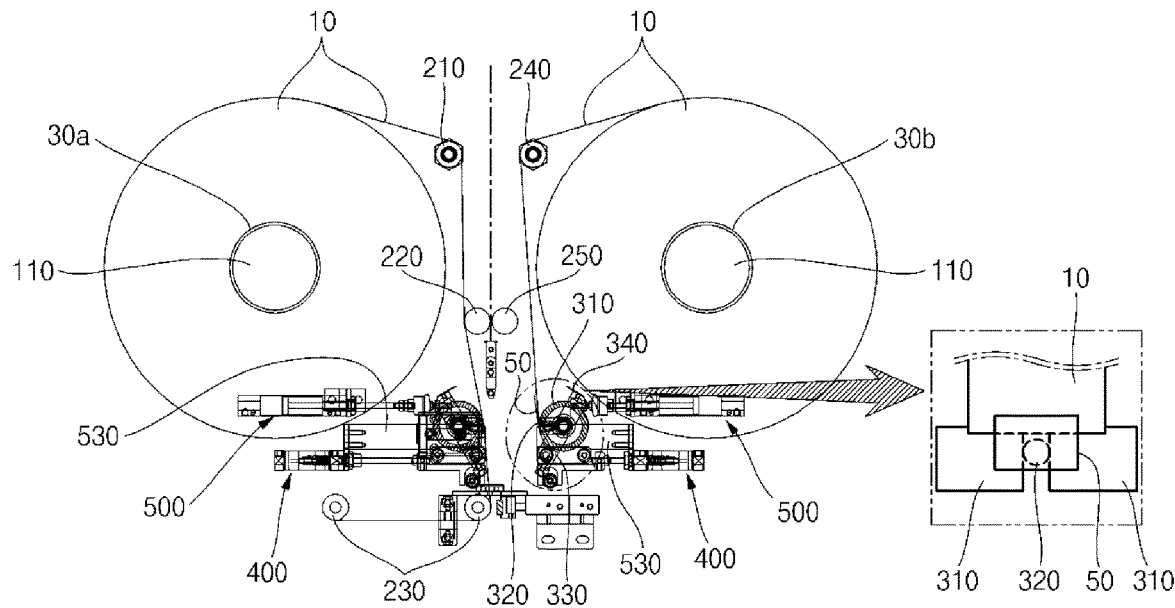

[FIG. 7]
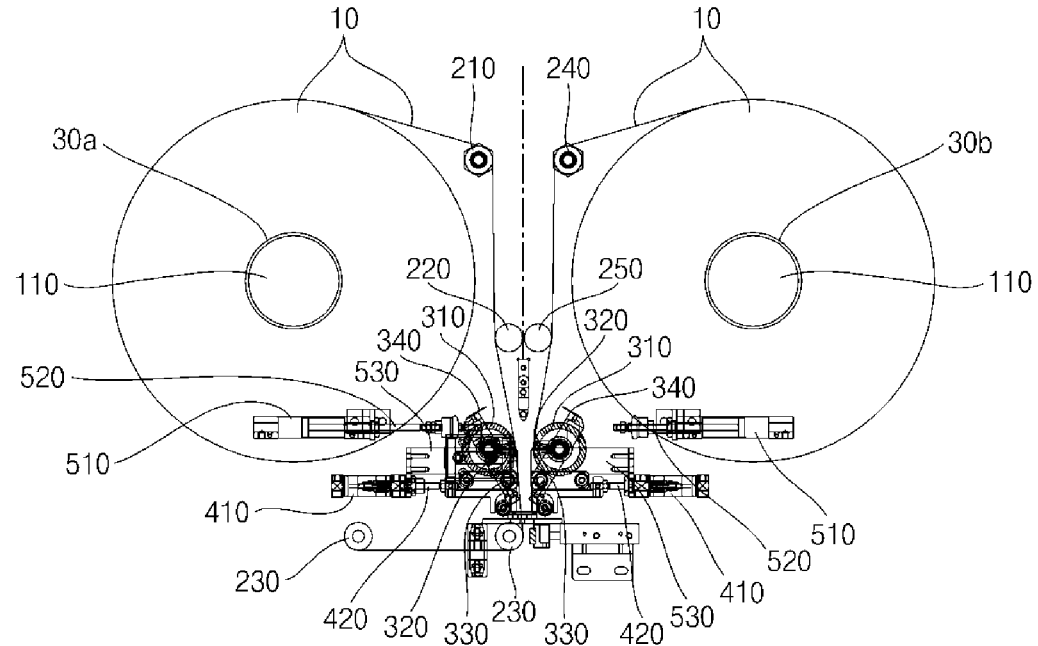
[FIG. 8]
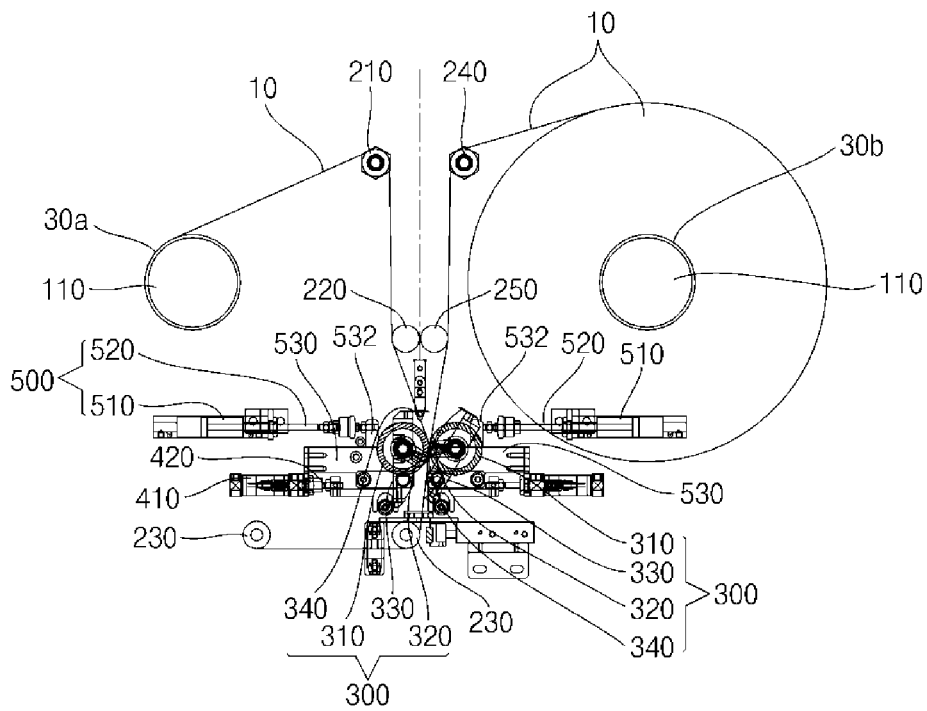

[FIG. 9]
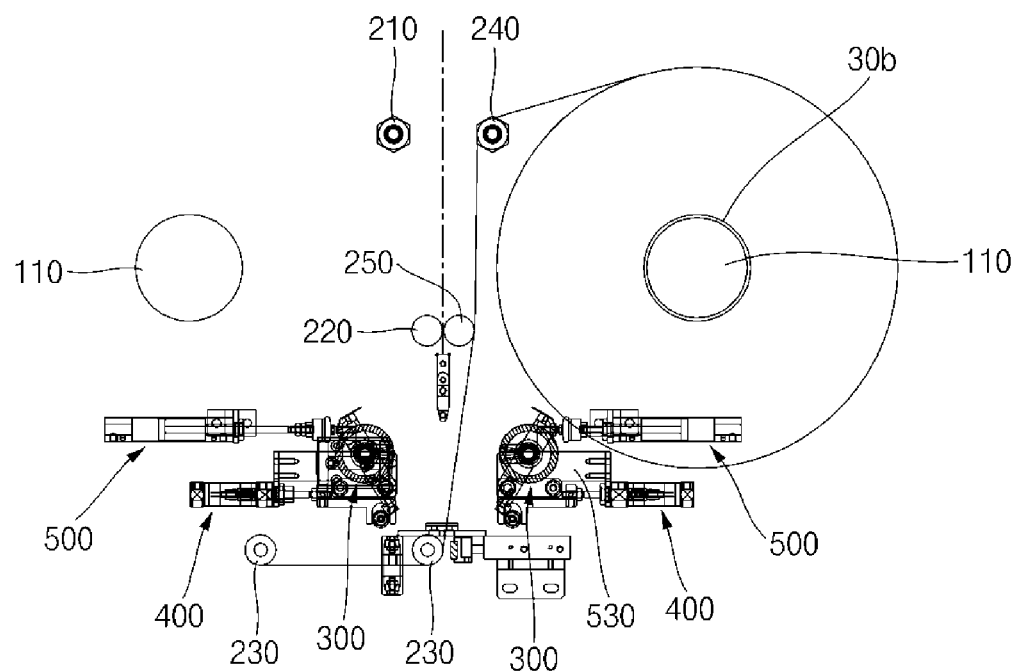

AUTOMATIC REPLACEMENT DEVICE OF SECONDARY BATTERY MATERIAL

BACKGROUND

1. Field

Embodiments relate to an automatic replacement device of a secondary battery material.

2. Description of the Related Art

In general, chemical batteries refer to batteries each including a positive electrode, a negative electrode and each generating electrical energy using a chemical reaction. The chemical batteries may be classified into primary batteries used for one-time use and secondary batteries that can be charged and discharged to be repeatedly usable.

Among the secondary batteries, lithium secondary batteries have high energy density per unit weight and are thus widely used for power sources of electronic communication devices, high-output hybrid vehicles, etc.

This detailed information described in the background technology is merely to improve understanding on the background, and thus may include information that does not constitute a related art.

SUMMARY

The embodiments may be realized by providing an automatic replacement device of a secondary battery material, the device including reel support parts configured to support a supply reel around which the secondary battery material is windable; a material support part spaced apart from the reel support part and configured to support the secondary battery material as it is unwound from the supply reel; clamping parts, each including a clamping roller spaced apart from the reel support parts and configured to come into contact with the secondary battery material when replacing the supply reel, a vacuum suction part adjacent to the clamping roller and configured to suction the secondary battery material by vacuum, a clamping frame configured to rotatably support the clamping roller and the vacuum suction part, and a cutter coupled to one side of the clamping frame and configured to cut the secondary battery material when coming into contact with the secondary battery material; first drive parts spaced apart from the clamping parts and configured to move the clamping roller toward and away from the secondary battery material; and second drive parts between the clamping parts and the first drive parts and configured to move the cutter toward and away from the secondary battery material, wherein the automatic replacement device is configured to cut the secondary battery material as the secondary battery material is suctioned to the vacuum suction part after being adhered to a secondary battery material wound around a replacement supply reel when the supply reel is replaced.

The reel support parts, the clamping parts, the first drive parts, and the second drive parts may be each provided as a pair that are arranged symmetrically to each other.

The reel support parts may each include a reel rotation shaft onto which the supply reel is insertable, and a reel frame configured to rotatably support the reel rotation shaft.

The material support part may include a first roller adjacent to the supply reel and configured to come into contact with and support one surface of the secondary battery material; a second roller spaced apart from the first roller and configured to come into contact with and support the other surface of the secondary battery material; and a third roller spaced apart from the second roller and configured to come into contact with and support the one surface of the secondary battery material.

The material support part may further include a fourth roller adjacent to the replacement supply reel and configured to come into contact with and support the one surface of the secondary battery material wound around the replacement supply reel; and a fifth roller spaced apart from the fourth roller and adjacent to the second roller and configured to come into contact with and support the other surface of the secondary battery material wound around the replacement supply reel.

The first drive parts may each include a first cylinder configured to provide a hydraulic pressure or a pneumatic pressure; and a first cylinder rod inserted into the first cylinder and configured to linearly move in a lengthwise direction of the first cylinder, and the first cylinder rod may be connected to a lower side of the clamping frame and is configured to move the lower side of the clamping frame forward toward the secondary battery material or rearward so as to be spaced apart from the secondary battery material.

The second drive parts may each include a second cylinder configured to provide a hydraulic pressure or a pneumatic pressure; a second cylinder rod inserted into the second cylinder and configured to linearly move in a lengthwise direction of the second cylinder; and a cylinder frame connected to one side of the clamping frame, and the second cylinder rod may be configured to move the cylinder frame forward toward the secondary battery material or rearward so as to be spaced apart from the secondary battery material.

When the cylinder frame moves forward, the cutter may come into contact with the secondary battery material and may cut the secondary battery material.

The automatic replacement device may further include a frame part including a pair of main frames installed facing each other and configured to rotatably support the second roller and the fifth roller; and a sub frame installed across the pair of main frames between the main frames.

The sub frame may further includes a through part on one side to pass through the sub frame in a lengthwise direction of the sub frame and through which the cutter passes; a suction tube installed inside the sub frame in the lengthwise direction; and a plurality of suction parts in communication with the suction tube and configured to suction foreign substances.

BRIEF DESCRIPTION OF THE DRAWINGS

Features will be apparent to those of skill in the art by describing in detail exemplary embodiments with reference to the attached drawings in which:

FIG. 1 is a front view of an automatic replacement device of a secondary battery material according to an embodiment;

FIG. 2 is an expanded perspective view in one direction of main parts of the automatic replacement device according to FIG. 1;

FIG. 3 is an expanded perspective view in another direction of main parts of the automatic replacement device according to FIG. 1;

FIG. 4 is an expanded perspective view of main parts of the automatic replacement device according to FIGS. 2 and 3;

FIG. 5 is a front view of an operation state of the automatic replacement device according to FIGS. 2 and 3;

FIG. 6 is a front view of a standby reel preparation state of the automatic replacement device according to FIGS. 2 and 3;

FIG. 7 is a front view of a first standby reel replacement step of the automatic replacement device according to FIGS. 2 and 3;

FIG. 8 is a front view of a second standby reel replacement step of the automatic replacement device according to FIGS. 2 and 3; and FIG. 9 is a front view of a standby reel preparation completion state of the automatic replacement device according to FIGS. 2 and 3.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used in this description, the terms "or" and "and/or" include any one or all combinations of one or more among the listed items. In addition, the term "connected" in this description means not only the case in which member A and member B are directly connected but also the case in which member A and member B are indirectly connected with member C interposed between member A and member B.

The terms used in this description will be used to describe a specific embodiment and not be construed to be limiting. As used in this description, singular forms do not clearly indicated a case different in context but may include a plurality of forms. In addition, when used in this description, the terms "comprise, include" and/or "comprising, including" specify presence of described shapes, numerals, operations, members, elements and/or a group thereof, and do not exclude presence or addition of one or more other shapes, numerals, operations, members, elements and/or a group thereof.

In this description, the terms such as first and second are used to describe various members, components, regions, layers and/or portions, and the members, components, regions, layers and/or portions should not be limited by the terms. The terms are used only to discriminate one member, component, region, layer or portion from other regions, layers or portions, and should not be considered to require sequential inclusion. Thus, a first member, a first component, a first region, a first layer or a first portion to be described below may refer to a second member, a second component, a second region, a second layer or a second portion.

The space-relating terms such as "beneath", "below", "lower", "above" or "upper" may be used for easy understanding of one element or feature, or another element or feature illustrated in a drawing. Such space-relating terms are for easy understanding according to various process states or use states, and are not limiting. For example, when an element or a feature is inverted, the element described as "lower" or "below" may be "upper" or "above". Thus, the term "lower" is a concept including the term "upper" or "below".

Hereinafter, a nonstop winding device for a secondary battery according to an embodiment will be described with reference to the accompanying drawings.

Herein, "a secondary battery material" may include a separator, a negative electrode, and a positive electrode that have plate shapes with predetermined lengths, and are used as terms that mean a material in a state before undergoing a step of being stacked or wound to make an electrode assembly.

An electrode assembly of a secondary battery may be formed by stacking a negative electrode plate and a positive electrode plate in a state of being separate from each other by a separator or winding the negative electrode plate and the positive electrode plate in a roll shape. In order to be stacked or wound as much as a length required for manufacturing the electrode assembly, the negative electrode plate, the positive electrode plate, and the separator may be continuously supplied to a manufacturing process of the electrode assembly. To this end, an automatic replacement device A of a material according to an embodiment may be used.

FIG. 1 is a front view of an automatic replacement device of a secondary battery material according to an embodiment. FIG. 2 is an expanded perspective view in one direction of the automatic replacement device according to FIG. 1. FIG. 3 is an expanded perspective view in another direction of main parts of the automatic replacement device according to FIG. 1. FIG. 4 is an expanded perspective view of main parts of the automatic replacement device according to FIGS. 2 and 3.

As illustrated in FIGS. 1 to 3, an automatic replacement device A of a secondary battery material according to an embodiment may include, e.g., a reel support part 100 for supporting a supply reel 30; a material support part 200 for supporting a secondary battery material 10 so as to feed the secondary battery material to the next process; a clamping part 300 used (e.g., for clamping) during replacement of the secondary battery material; a first drive part 400, a second drive part 500, and a frame part 600 for supporting the clamping part 300, the first drive part 400, and the second drive part 500.

When viewed in FIG. 1, the clamping part 300, the first drive part 400, the second drive part 500, and the frame part 600 may be below the supply reel 30, or may be not in a vertical arrangement but on the same plane. Hereinafter, for convenience of description, with respect to FIG. 1, a structure in which the clamping part 300, the first drive part 400, the second drive part 500, and the frame part 600 are below the supply reel 30 will be exemplarily described.

The reel support part 100 may include a reel rotation shaft 110 (into which a supply reel 30 wound in a roll shape is insertable); and a reel frame 120 (that rotatably supports the reel rotation shaft 110). In an implementation, in the reel support part 100, the reel rotation shaft 110 may be fixed on the reel frame 120, and the reel rotation shaft 110 may rotatably support the supply reel 30. An end section of the secondary battery material 10 may be unwound from a state of being wound on the supply reel 30, and may then be fed to the next process via the material support part 200.

In the reel support part 100 in this embodiment, all constituent components each are prepared in one pair and facing each other so as to be symmetrical to each other. For example, as will be described in greater detail below, some components on a left side of the apparatus may be arranged in a mirror image arrangement with respect to the corresponding components on the right side of the apparatus. When the secondary battery material 10 on the supply reel 30 installed in one reel support part 100 is completely consumed, a secondary battery material 10 on another supply reel 30 installed on the facing reel support part 100 may be supplied in place of the secondary battery material 10 in the one reel support part 100. The material support part 200 may be on a movement path along which the secondary battery material 10 is unwound and moves. Hereinafter, for convenience of description, the left supply reel 30 is defined as a first supply reel 30a and the right supply reel 30 is defined as a second supply reel 30b with respect to FIG. 1.

The material support part 200 may be provided as a plurality of rollers, which may be spaced apart from each other on the movement path of the secondary battery material 10. The material support part 200 may be configured as free rollers that rotate by a force pulling the secondary battery material 10 from the outside of the automatic replacement device A. In an implementation, the material support part 200 may provide support while rotating by an external force so that a tension of the secondary battery material 10 may be maintained. In an implementation, the material support part 200 may alternately support one or the other surface of the secondary battery material 10.

In an implementation, the material support part 200 may include, e.g., a first roller 210 adjacent to the first supply reel 30a; a second roller 220 spaced apart from the first roller 210; and a plurality of third rollers 230 in a direction toward the next process. In an implementation, the material support part 200 may include a fourth roller 240 adjacent to the second supply reel 30b and spaced apart from the first roller 210; and a fifth roller 250 adjacent to the second roller 220.

As illustrated in FIG. 1, the first roller 210 and the fourth roller 240 may be on the reel frame 120, and as illustrated in FIGS. 2 and 3, the second roller 220 and the fifth roller 250 may be on a main frame 610 on the frame part 600 (this will be described in greater detail below).

The first roller 210 to the second roller 220 may be used when the second battery material 10 is supplied from the first supply reel 30a, and the fourth roller 240 and the fifth roller 250 may be used to support the secondary battery material 10 when the secondary battery material 10 on the first supply reel 30a is completely consumed and then the first supply reel is replaced with the second supply reel 30.

As illustrated in FIG. 1, the clamping part 300 may be installed on the frame part 600 and may be spaced apart from the second roller 220, and the secondary battery material 10 may pass between the second roller 220 and the clamping part 300.

As illustrated in FIGS. 2 and 4, the clamping part 300 may include, e.g., a pair of clamping rollers 310; a vacuum suction part 320 between the clamping rollers 310; a clamping frame for supporting the clamping rollers 310; and a cutter 340 on one side of the clamping frame 330.

As illustrated in FIGS. 2 and 3, the clamping part 300 may be disposed so that the same structures are symmetrical to each other at mutually facing positions on the frame unit 600. That is, in the clamping part 300, all components each may be provided in one pair which is disposed facing each other on the frame part 600. The mutually facing clamping parts 300 may function to clamp and cut the secondary battery material 10 when the secondary battery material 10 is replaced.

As illustrated in FIG. 4, the pair of clamping rollers 310 may be coupled to roller support shafts with the vacuum suction part 320 therebetween, and the roller support shafts may be rotatably supported on the clamping frame 330. The vacuum suction part 320 and a vacuum connection tube 322 may be in communication (e.g., fluid communication) with each other. The clamping rollers 310 may press the secondary battery material 10 suctioned or held by the vacuum suction part 320 from both surface directions. The clamping rollers 310 may be rotatably installed on the clamping frame 330. The clamping rollers 310 may only be used during clamping of the second battery material 10, and the rotation angles thereof may be limited so that the clamping rollers 310 rotate only up to a suction position from a standby position of the vacuum suction part 320.

As illustrated in FIG. 4, the vacuum suction part 320 may suction the surface of the secondary battery material 10 by vacuum and may cause the secondary battery material 10 to come into close contact with outer circumferential surfaces of the clamping rollers 310. In an implementation, the vacuum suction part 320 may be connected to the vacuum connection tube 322 and may generate a suction force by application of a vacuum. The vacuum connection tube 322 may pass through the clamping rollers 310 so as not to interfere with the operation of the clamping rollers 310 and may be connected to the outside of the clamping frame 330.

The vacuum suction part 320 may face toward the second roller 220 and the fifth roller 250 at a standby position (position shown in FIG. 4), and may face the secondary battery material 10 at a suction position (refer to FIG. 6 to be described below).

In order to replace the secondary battery material 10, when the mutually facing clamping rollers 310 on the frame part 600 come into close contact with the secondary battery material 10, the clamping rollers 310 may press the secondary battery material 10. Both surfaces of each of the secondary battery materials 10 on the first supply reel 30a and the second supply reel 30b may be uniformly pressed while the secondary battery materials 10 pass through or between the clamping rollers 310 facing each other, the secondary battery materials 10 on the first supply reel 30a and the second supply reel 30b may come into uniform contact without an air bubble and may be connected to each other (a method for connecting the secondary battery materials in the first supply reel and the second supply reel will be described below).

As illustrated in FIG. 2, the clamping rollers 310 and the vacuum suction part 320 may be coupled to the penetrated inside of the clamping frame 330 having a rectangular frame shape, and the cutter 340 may be on one outer surface of the clamping frame 330. The clamping frame 330 may rotatably support the roller support shafts that pass through and are inserted into the pair of clamping rollers 310. To this end, both ends of the roller support shafts may be rotatably supported on two mutually facing surfaces in the rectangular frame of the clamping frame 330. The vacuum connection tube 322 may be drawn out by passing through one surface of the two surfaces. In an implementation, the clamping rollers 310 may be rotatably supported inside the rectangular frame of the clamping frame 330.

The clamping frame 330 may rotationally move toward the secondary battery material 10 in link with the operation of the first drive part 400 or the second drive part 500 (this will be described below).

With respect to FIG. 2, the cutter 340 may be coupled to an outer upper surface of the clamping frame 330 and may be installed below a safety cover 640 to be described below.

The cutter 340 may have a length smaller than the length of the upper surface of the clamping frame 330. The cutter 340 may be installed so that a cutting blade protrudes (e.g., inwardly) more than the clamping frame 330, and may come into contact with and cut the secondary battery material 10 when the upper side of the clamping frame 330 approaches the secondary battery material 10.

The operation of the cutter 340 may be performed in link with the operation of the clamping frame 330, and the movement or operation of the clamping frame 330 may be performed by the first drive parts 400 and the second drive parts 500.

Hereinafter, for convenience of description, a forward movement is defined as a movement in a direction approaching the clamping parts that face each other with respect to the lengthwise directions of a first cylinder and a second cylinder, a backward movement is defined as a movement in a direction moving away from the clamping parts, and the first drive parts 400 and the second drive parts 500 will be described.

As illustrated in FIGS. 1 to 4, the first drive parts 400 may be respectively installed below the pair of supply reels 30, and may be installed below the second drive parts 500. The first drive parts 400 may be respectively installed below the first supply reel 30a and the second supply reel 30b and may have mutually symmetrical structures. The first drive parts 400 may each include, e.g., a first cylinder 410 and a first cylinder rod 420, a cylinder fixing bracket 430 for fixing the first cylinder to a cylinder frame 530 of the second drive part 500; a rod fixing bracket 440 for fixing the first cylinder rod 420; and a first connection bracket 450 for connecting the rod fixing bracket 440 to the clamping frame 330.

As illustrated in FIGS. 2 and 3, the first cylinder 410 may provide a drive force by hydraulic pressure or pneumatic pressure, and may be installed approximately perpendicular to the movement direction of the secondary battery material 10 unwound toward the second roller 220 from the first roller 210. The first cylinder rod 420 may be inserted into the first cylinder 410 and may linearly move in the forward or rearward direction along the lengthwise direction of the first cylinder 410. One end of the first cylinder 410 may be fixed onto the cylinder frame 530 of the second drive parts 500 by the cylinder fixing bracket 430. The first cylinder rod 420 may pass through the cylinder fixing bracket 430 and may be coupled to the rod fixing bracket 440.

The rod fixing bracket 440 may be fixed to an end of the first cylinder rod 420 and may linearly move in the lengthwise direction of the first cylinder rod 420 due to movement of the first cylinder rod 420. The rod fixing bracket 440 may have a frame shape that is folded or bent a plurality of times according to need and may be coupled to the first connection bracket 450.

As illustrated in FIGS. 2 and 3, the first connection bracket 450 may have a shape to which one or a plurality of brackets folded or bent a plurality of times are coupled, and may connect the rod fixing bracket 440 and the clamping frame to each other. The first connection bracket 450 may be coupled to an outer lower surface of the clamping frame 330 with respect to FIGS. 2 and 3. In an implementation, as illustrated in the drawings, the rod fixing bracket 440 and the first connection bracket 450 may be provided in plurality and mutually connected, or may have a one-frame structure.

As illustrated in FIGS. 1 to 4, the second drive parts 500 may be respectively installed below the pair of supply reels 30, and may be installed between the first drive parts 400 and the supply reels 30. The second drive parts 500 may be respectively installed below the first supply reel 30a and the second supply reel 30b and may have mutually symmetrical structures. The second drive parts 500 may each include, e.g., a second cylinder 510 and a second cylinder rod 520; a cylinder frame 530 that moves due to movement of the second cylinder rod 520; a connection pin 540 and a second connection bracket 550 that connect the cylinder frame 530 to the clamping frame 330.

As illustrated in FIGS. 2 and 3, the second cylinder 510 may provide a drive force by a hydraulic pressure or a pneumatic pressure, and the second cylinder rod 520 may be inserted into the second cylinder 510 and may linearly move forward or rearward in the lengthwise direction of the second cylinder 510. One end of the second cylinder 510 may be fixed to the reel frame 120 or on an installation surface by a support frame 630. The second cylinder rod 520 may pass through the support frame 630. The second cylinder rod 520 may push a push arm 532 of the cylinder frame 530 to be described below and may move the cylinder frame 530.

As illustrated in FIGS. 2 and 3, the cylinder frame 530 may have a plate shape having a predetermined size and thickness, and may have one side to which the cylinder fixing bracket 430 is coupled and the other side to which one side of the clamping frame 330 is coupled. The other side coupled to the cylinder frame 530 may be a surface opposite to a surface to which the vacuum connection tube 322 exposes in the clamping frame 330. With respect to FIGS. 2 and 3, a push arm 532 may protrude from an upper surface of the cylinder frame 530 and a connection pin 540 may be coupled to one lower surface.

The push arm 532 may be a portion pressed by the second cylinder rod 520 when the second cylinder rod 520 is extended from the second cylinder 510. The second cylinder rod 520 pushes the push arm 532, so that the mutually facing cylinder frames 530 may approach each other.

The connection pin 540 may have a cylindrical shape and may have one end coupled to one surface of the cylinder frame 530 and the other end extending in the width direction of the clamping rollers 310. A link-like second connection bracket 550 may be coupled to the other end, and the second connection bracket 550 may connect the connection pin 540 and a lower side of the clamping frame 330.

With respect to FIGS. 2 and 3, the mutually facing clamping frames 330 may move forward so as to be adjacent to each other or move rearward to original positions thereof. In an implementation, when the first cylinder rod 420 extends with respect to the first cylinder 410, the rod fixing bracket 440 and the first connection bracket 450 (which are connected to the first cylinder rod 420) may push the lower side of the clamping frame 330 while moving. Accordingly, the lower end of the clamping frame 330 may move in a direction away from the first cylinder 410, and the lower ends of the pair of pair of clamping frames 330 may approach each other. In an implementation, only the lower end of the clamping frame 330 may move due to movement of the first cylinder rod 420, and the pair of mutually facing cutters 340 may be maintained at a state of being maximally spaced apart from each other.

In an implementation, when the push arm 532 of the cylinder frame 530 is pushed by the second cylinder rod 520, the cylinder frame 530 may move in a direction away from the second cylinder 510. The cylinder frame 530 may be connected to the clamping frame 330 by the connection pin 540 and the second connection bracket 550, and when the cylinder frame 530 moves, the clamping frame 330 may also move in the same direction.

The first cylinder rod 420 may not be connected to the cylinder frame 530, and may only be connected to the clamping frame 330. When the first cylinder rod 420 moves, the cylinder frame 530 may not move and only the lower end of the clamping frame 330 moves in a direction away from the first cylinder 410.

In an implementation, only the lower end of the clamping frame 330 moves by operation the first drive parts 400. In an implementation, the clamping frame 330 or other portions connected thereto move at once by operation of the second drive parts 500.

While the lower end of the clamping frame 330 is far from the first cylinder 410, the cutters 340 may approach each other or move away from each other by the operation of the second drive parts 500. The positions at which the cutters 340 make contact with the secondary battery material 10 are defined as the cut positions, and the cutters 340 may be approximately parallel to the first cylinder 410 or the second cylinder 510 at the cut positions, and may be approximately perpendicular to the contact positions of the secondary battery material 10. The positions at which the cutters 340 are far from the secondary battery material 10 are defined as cutting standby positions, and the cutters may be in non-contact states with the secondary battery material 10 at the cutting standby positions. The cutting standby positions may include all positions between a state in which lower ends of the mutually facing clamping frames 330 approach each other and a state of maximum distance between the lower ends.

The frame part 600 may include several frame structures that are coupled to and support the clamping part 300, the first drive parts 400, and the second drive parts 500 which are described above.

As illustrated in FIGS. 1 to 4, the frame part 600 may include, e.g., a pair of main frames 610 that rotatably support the second roller 220 and the fifth roller 250; and a sub frame 620 between and crossing the pair of main frames 610. In addition, the frame part 600 may further include a plurality of support frames 630 and a safety cover 640 coupled to the main frames 610. The support frames 630 are the plurality of frames that simply support and connect the various structures, and thus, detailed description thereon may be omitted.

As illustrated in FIG. 2, the main frames 610 may have a shape of a pair of plate shapes facing each other, and the second roller 220 and the fifth roller 250 may be between the mutually facing surfaces of the main frames 610. The sub frames 620 may be spaced apart from each other below the second roller 220 and the fifth roller 250.

As illustrated in FIG. 2, the sub frames 620 may be formed in a pair of mutually facing frame structures or in a rectangular frame structures. As illustrated in FIG. 4, a through part 622 may be on one side of each sub frame 620 in the lengthwise direction of the sub frame. A suction tube 624 may be installed inside the sub frame 620 in the lengthwise direction of the sub frame, and a plurality of foreign substance suction parts 624a may be formed in the suction tube 624.

As illustrated in FIGS. 2 and 4, the through part 622 may be a portion that functions as a window through which the cutter 340 moves in and out during the operation thereof, and may be a hole formed passing through the sub frame 620. The through part 622 may be formed in a size of a degree that does not interfere with the operation of the cutter 340.

As illustrated in FIGS. 2 and 4, the suction tube 624 may have a hollow tube shape, and the foreign substance suction part 624a may be formed in the lengthwise direction on the outer circumferential surface of the suction tube 624. The suction tube 624 may have a structure that is connected to a pump or the like installed outside and in which a negative pressure is formed by suctioning air and foreign substances flow into the suction tube 624 through the foreign substance suction part 624a that is op to and in fluid communication with the suction tube 624. Foreign substances generated during the operation of the cutters 340 may be suctioned through the foreign substance suction part 624a and may be discharged to the outside of the automatic replacement device A.

As illustrated in FIGS. 2 and 3, the safety cover 640 may be coupled to the main frames 610, and may be plate members with predetermined sizes installed in the lengthwise directions of the cutters 340. The safety cover 640 may help prevent the cutters 340 from rotating at an angle more than a certain angle during the operations of the cutters 340. In an implementation, when the cutters 340 rotate toward the second cylinder 510 by the predetermined angle or more, the cutters 340 may be prevented from coming into contact with the safety cover 640 and exposing to the outside of the safety cover 640. To this end, the safety cover 640 may have a shape in which an end section thereof is bent at a portion for which the rotation angles of the cutters 340 are required to be controlled. In addition, the safety cover 640 may be formed greater than the lengths of the cutters 340.

Hereinafter, a method for replacing a supply reel on which a secondary battery material is wound will be described with reference to FIGS. 5 to 9. Structures that are not illustrated in FIGS. 5 to 9 will be described with reference to FIGS. 1 to 4 described above.

FIG. 5 is a front view of an operation state of the automatic replacement device according to FIGS. 2 and 3.

As illustrated in FIG. 5, when the secondary battery material 10 wound around the first supply reel 30a is being supplied, the secondary battery material 10 may be in a state of moving sequentially via the first roller 210, the second roller 220 and the third roller 230.

At this point, the first cylinder rod 420 may be extended from the first cylinder 410, the lower end of the clamping frame 330 may move forward and may be in a state of being maximally spaced apart from the first cylinder 410, and the second cylinder rod 520 may be in a state of not being maximally extended. The upper end of the clamping frame 330 may be in a state of being spaced apart from the secondary battery material 10 (e.g., an acute angle may be formed between the clamping frame and the first cylinder rod). Accordingly, the cutters 340 may be in a state of being spaced apart from the secondary battery material 10, and only the clamping rollers 310 may be in a state of coming into contact with the secondary battery material 10. In addition, vacuum may not be provided to the vacuum suction part 320, and the clamping rollers 310 may only function to support the secondary battery material 10 while rotating.

FIG. 6 is a front view of a standby reel preparation state of the automatic replacement device according to FIGS. 2 and 3.

As illustrated in FIG. 6, in order to replace the first supply reel 30a, the second supply reel 30b may be prepared at a position symmetrical to the first supply reel 30a. The secondary battery material 10 wound around the second supply reel 30b may have an end section to which an adhesive tape 50 is attached, and the adhesive tape 50 may be in a state of suctioned to the vacuum suction part 320 and may be temporarily fixed thereto.

At this point, the adhesive surface of the adhesive tape 50 may face the secondary battery material 10 wound around the first supply reel 30*a*. An end section of the adhesive tape 50 may be slightly longer than the lower end of the vacuum suction part 320, and may generate a suction force from the vacuum suction part 320 to be sufficiently applied.

The first cylinder rod 420 may be extended from the first cylinder 410 in a preparation state of the second supply reel 30*b*, and the lower end of the clamping frame 330 may move forward and may be in a state of being maximally spaced apart from the first cylinder 410. In addition, the second cylinder rod 520 may be maximally accommodated in the second cylinder 510, and the upper end of the clamping frame 330 may be in a state of being minimally spaced apart from the second cylinder 510 (e.g., an acute angle may be formed between the clamping frame and the first cylinder rod). Accordingly, the cutters 340 may be in a state of being spaced apart from the secondary battery material 10.

FIG. 7 is a front view of a second standby reel replacement step of the automatic replacement device according to FIGS. 2 and 3.

As in FIG. 7, in order to replace the first supply reel 30*a*, the secondary battery material 10 wound around the second supply reel 30*b* may be close to the secondary battery material 10 wound around the first supply reel 30*a*. In an implementation, the first drive part 400 below the second supply reel 30*b* may be driven. For convenience of description, when the second supply reel 30*b* side is assumed to be the right side, the second cylinder rod 520 on the right side may be extended and moves forward to cause an end section of the right-side secondary battery material 10 to approach the left-side secondary battery material 10.

FIG. 8 is a front view of a second standby reel replacement step of the automatic replacement device according to FIGS. 2 and 3.

In the state of FIG. 7, when the supply of the secondary battery material 10 on the first supply reel 30*a* is nearly completed, the main material supply source may be replaced to or by the second supply reel 30*b*. In an implementation, a color tape may be attached on the secondary battery material 10, and a sensor for detecting the color tape may be provided adjacent to the third roller 230. When the color tape is detected by the sensor, a detection signal may be transmitted to a separate controller, and the (e.g., left-side) second drive part 500 is driven by the controller.

The second cylinder rod 520 may push a push arm 532 of the cylinder frame 530 while extended maximally from the second cylinder 510, and the cylinder frame 530 may move the clamping frame 330 toward the right-side clamping part 300.

At this point, the clamping rollers 310 on the left-side clamping part 300 may come into contact with the clamping part 300 of the right-side clamping part 300, and the secondary battery material 10, which is in contact with the left-side clamping rollers 310 and is on the first supply reel 30*a*, may be attached to an adhesive tape 50 on an end section of the secondary battery material 10 on the second supply reel 30*b*.

In this state, cutting may be performed while the cutters 340 come into contact with the secondary battery material 10 on the first supply reel 30*a* by rotation of the clamping frame 330. At this point, the angle formed by the clamping frame 330 and the first cylinder may be a dull or obtuse angle, an cutting may be performed after adhesion between the left and right-side secondary battery materials is firstly formed. Accordingly, cutting of the secondary battery material 10 on the first supply reel 30*a* may be performed in a state of being adhered to the secondary battery material 10 on the second supply reel 30*b*. For example, when the first supply reel 30*a* is running out of material, only the cutter on the left side may be activated, such that only the secondary battery material 10 from the first supply reel 30*a* is cut, and the secondary battery material 10 from the second supply reel 30*b* is not cut.

Through such operations, the secondary battery material 10 on the first supply reel 30*a* may be connected to the secondary battery material 10 on the second supply reel 30*b*, and thus, the secondary battery material 10 may be continuously supplied from the second supply reel 30*b* without a stop in the operation of the automatic replacement device A.

FIG. 9 is a front view of a standby reel preparation completion state of the automatic replacement device according to FIGS. 2 and 3.

As in FIG. 9, when the replacement from the first supply reel 30*a* by the second supply reel 30*b* is completed, the first drive part 400 and the second drive part 500, which are on the left side, may move rearward and return to original positions thereof again. Subsequently, a replacement reel may be prepared again in the same manner as described above, and may be replaced in the same manner after waiting. In an implementation, the supply reel 30 around which the secondary battery material 10 is wound may be replaced without a stop in the operation of the automatic replacement device A, and the secondary battery material 10 may continuously be supplied.

In an implementation, two supply reels may be supplied. In an implementation, the number of supply reels may be increased by providing a plurality of material support parts and a plurality of clamping parts.

By way of summation and review, separators or electrode plates used for or during production of secondary batteries may be used while wound on a plurality of supply reels. When the separators and electrodes being supplied on the supply reels are completely supplied, e.g., when the supply reels are empty, an operator should manually replace the reels with other reels. There may be a limitation in that the production process of the second batteries is stopped and the productivity may be degraded during the replacement of the separators or electrodes.

One or more embodiments may provide an automatic replacement device of a secondary battery material with which a supply reel may be automatically or easily replaced without a stop in the production process of a secondary battery when a separator or an electrode plate supply reel is replaced.

According to an embodiment, the supply reel may be automatically replaced without a stop in the production process when replacing the supply reel for a separator or an electrode plate, and thus, there may be an effect of reducing a production process time as much as eliminating delay and waiting time.

In addition, a cutter-integrated clamp roller may be used, and an air bubble may not be generated when attaching end sections of the separator or the electrode plate, and adhesiveness may be improved. Therefore, supply of the separator or the electrode plate may be smoothly performed without a stop.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An automatic replacement device of a secondary battery material, the device comprising:
   a first supply reel and a second supply reel;
   reel support parts, each of the reel support parts including a reel rotation shaft onto which the first and second supply reels are insertable and each of which is configured to support the first and second supply reels around which the secondary battery material is windable and from which the secondary battery material can be unwound;
   a material support part spaced apart from the reel support parts and configured to support the secondary battery material as the secondary battery material is unwound from one of the first and second supply reels;
   clamping parts, the clamping parts being configured to be movable independently from the material support part and each including:
      a clamping roller spaced apart from the reel support parts and configured to come into contact with the secondary battery material when replacing the first and second supply reels,
      a vacuum suction part adjacent to the clamping roller and configured to suction the secondary battery material by vacuum,
      a clamping frame configured to rotatably support the clamping roller and to support the vacuum suction part, and
      a cutter coupled to one side of the clamping frame and configured to cut the secondary battery material when coming into contact with the secondary battery material;
   first drive parts spaced apart from the clamping parts and configured to move the clamping roller toward and away from the secondary battery material;
   second drive parts between the clamping parts and the first drive parts and configured to move the cutter toward and away from the secondary battery material; and
   a frame part,
   wherein the reel support parts, the clamping parts, the first drive parts, and the second drive parts are each provided as a pair that are arranged symmetrically to each other,
   wherein the frame part is directly coupled to and supports each of the pair of clamping parts, the pair of first drive parts, and the pair of second drive parts,
   wherein the automatic replacement device is configured to cut a first web of secondary battery material wound around the first supply wheel as the first web of secondary battery material is suctioned to the vacuum suction part after being adhered to a second web of secondary battery material wound around the second supply reel when the first supply reel is replaced, and
   wherein the automatic replacement device is configured to replace the secondary battery material without a stop in an operation of the automatic replacement device.

2. The automatic replacement device as claimed in claim 1, wherein the reel support parts each include:
   a reel frame configured to rotatably support the reel rotation shaft.

3. The automatic replacement device as claimed in claim 1, wherein the material support part includes:
   a first roller adjacent to one of the first and second supply reels and configured to come into contact with and support one surface of the secondary battery material;
   a second roller spaced apart from the first roller and configured to come into contact with and support the other surface of the secondary battery material; and
   a third roller spaced apart from the second roller and configured to come into contact with and support the one surface of the secondary battery material.

4. The automatic replacement device as claimed in claim 3, wherein the material support part further includes:
   a fourth roller adjacent to the second supply reel and configured to come into contact with and support the one surface of the secondary battery material wound around the second supply reel; and
   a fifth roller spaced apart from the fourth roller and adjacent to the second roller and configured to come into contact with and support the other surface of the secondary battery material wound around the second supply reel.

5. The automatic replacement device as claimed in claim 1, wherein:
   the first drive parts each include:
      a first cylinder configured to provide a hydraulic pressure or a pneumatic pressure; and
      a first cylinder rod inserted into the first cylinder and configured to linearly move in a lengthwise direction of the first cylinder, and
   the first cylinder rod is connected to a lower side of the clamping frame and is configured to move the lower side of the clamping frame forward toward the secondary battery material or rearward so as to be spaced apart from the secondary battery material.

6. The automatic replacement device as claimed in claim 1, wherein:
   the second drive parts each include:
      a second cylinder configured to provide a hydraulic pressure or a pneumatic pressure;
      a second cylinder rod inserted into the second cylinder and configured to linearly move in a lengthwise direction of the second cylinder; and
      a cylinder frame connected to one side of the clamping frame, and
   the second cylinder rod is configured to move the cylinder frame forward toward the secondary battery material or rearward so as to be spaced apart from the secondary battery material.

7. The automatic replacement device as claimed in claim 6, wherein when the cylinder frame is moved forward, the cutter comes into contact with the secondary battery material and cuts the secondary battery material.

8. The automatic replacement device as claimed in claim 4, wherein the frame part further includes:
   a pair of main frames installed facing each other and configured to rotatably support the second roller and the fifth roller; and
   a sub frame installed across the pair of main frames between the main frames.

9. The automatic replacement device as claimed in claim 8, wherein the sub frame further includes:
   a through part on one side to pass through the sub frame in a lengthwise direction of the sub frame and through which the cutter passes;

a suction tube installed inside the sub frame in the lengthwise direction; and a plurality of suction parts in communication with the suction tube and configured to suction foreign substances.

* * * * *